US007211552B1

(12) United States Patent
Thoele

(10) Patent No.: US 7,211,552 B1
(45) Date of Patent: May 1, 2007

(54) ENZYMATIC DETERGENT

(76) Inventor: Melton Sherwood Thoele, 1130 Blacksburg Rd., Fincastle, VA (US) 24090

( * ) Notice: Subject to any disclaimer, the term of this patent is extended or adjusted under 35 U.S.C. 154(b) by 392 days.

(21) Appl. No.: 10/813,966

(22) Filed: Mar. 31, 2004

Related U.S. Application Data

(63) Continuation-in-part of application No. 10/293,854, filed on Nov. 13, 2002, now abandoned.

(51) Int. Cl.
*C11D 3/20* (2006.01)
*C11D 3/02* (2006.01)
*C11D 3/28* (2006.01)
*C12S 9/00* (2006.01)

(52) U.S. Cl. ...................... 510/161; 510/179; 510/392; 510/393; 510/401; 510/405; 510/530

(58) Field of Classification Search ................ 510/163, 510/166, 175, 245, 422, 161, 179, 392, 393, 510/401, 405, 530; 252/135
See application file for complete search history.

(56) References Cited

U.S. PATENT DOCUMENTS 3,829,563 A * 8/1974 Barry et al. ................ 510/124
4,456,544 A 6/1984 Lupova et al.
5,073,292 A 12/1991 Hessel et al.
5,124,066 A 6/1992 Russell
H1467 H 8/1995 Prieto et al.
5,451,342 A * 9/1995 Desai ......................... 510/237
H1513 H 1/1996 Murch et al.
5,510,052 A 4/1996 McCandlish
5,529,788 A 6/1996 DeSenna
5,567,385 A 10/1996 Miller et al.
5,589,507 A 12/1996 Hall
5,810,944 A 9/1998 Smitkowski
H1776 H 1/1999 Linard
H1818 H * 11/1999 Potgieter et al. ............ 510/422
6,235,692 B1 5/2001 Scoville
6,239,089 B1 * 5/2001 Cala et al. .................. 510/175
6,387,858 B1 5/2002 Shah et al.
6,420,332 B1 7/2002 Simpson
2002/0103096 A1 8/2002 Kott et al.

* cited by examiner

*Primary Examiner*—Douglas McGinty
*Assistant Examiner*—Preeti Kumar
(74) *Attorney, Agent, or Firm*—James W. Hiney

(57) ABSTRACT

A non-toxic enzymatic detergent for use in cleaning surgical instruments and the like which have a large build-up of bio-residue thereon and which need specialty cleaning in order to avoid both hardened bio-residue and certain fluid traces from the instruments for both operating accuracy as well as sterilization requirements.

32 Claims, No Drawings

ENZYMATIC DETERGENT

This application is a Continuation-In-Part of U.S. application Ser. No. 10/293,854, filed on Nov. 13, 2002, now abandoned, in the United States Patent & Trademark Office. The new sections of this application are underlined for clarity's sake and to afford the Examiner an efficient method in reviewing the new material. A copy of this specification without the underlining can be provided upon request.

This invention relates to a new and improved enzymatic detergent which are designed for cleaning surgical instruments and the like. The detergent contains elements specifically designed to remove certain fluid traces from surgical instruments such as blood, lipids, etc.

BACKGROUND

Surgical instruments and equipment, when used, inevitably pick up amounts of bio-burden on them after being employed in operations on humans or animals. The definition of instruments includes ridged and flexible scopes, laparoscopic instruments, trays and anything that gets soiled with body fluids which result in them having varying amounts of bio-burden on them after being so used. The body fluids, such as blood, lipids and synovial fluids from joints, form an adhesive like bond to the items used during surgeries and animal processing or operations. As these fluids dry, the adhesive like bonds get stronger and the fluids get harder to dissolve using ordinary cleaning methods. The adhesive like bond becomes too strong to break for normal detergents which contain only surfactants and inorganic reagents because routine detergents are chemically and physically unable to dissolve or react with many body fluids. The chemical structures of these detergents do not allow them to react with body fluids without the body fluids first being changed by other chemicals like enzymes. Enzymes like protease and lipase break these body fluids down by the chemical reaction called hydrolysis which also breaks down their adhesive bond to the items the fluids are adhered to. When broken down in this manner, body fluids become more soluble in surfactants and can then be washed away.

Existing Cleansers

All of the currently used cleansers or detergents employed to clean body fluids and soil off surgical, medical and animal processing or operative items react very slowly and require multiple steps and processes. It is not unusual for these cleansers to take up to 10 or 20 minutes to clean. Such multiple steps and processes include:

1. Pretreatment immediately after use, as in the operating room, with gels to keep the items moist.
2. Sonicating the items with high frequency sound waves in an enymatic solution to help dissolve and speed up the cleaning process.
3. Soaking in an enzymatic solution 10 to 20 minutes to help remove the body fluids and soil, and
4. Scrubbing with a metal brush to remove the body fluids still left on the items even after completing steps 1 through 3.

Current enzymatic cleansers require these steps and processes as they do not have appropriate builders to increase surfactant and enzyme cleaning ability. In addition, they don't have correct buffers for stabilizing the pH at the high level, approximately 9 to 11, required for optimum enzyme activity, other enzyme enhancers and metal cleaning compounds in a single cleanser. All of the current enzymatic cleansers used to clean these items can only remove body fluids and soil and only after going through some or all of the steps and processes outlined above as they do not contain the compounds to remove bonded inorganic material from metals. None of them remove the metallic oxides, carbonates and sulfides that get bonded to these items, especially metals, from exposure to elements in body fluids, soil and air that leaves these compounds on them as white and gray film or spots. The current enzymatic cleansers cannot remove this film and/or spots as they do not contain the chemicals that bond to and solubilize these ions, like sequestering agents.

Many of the enzymatic cleansers currently available on the market can only be used on certain types of materials as they contain corrosives like hydroxides and strong organic solvents like hydroxides and strong organic solvents like alcohol that corrode aluminum, steel and plastics. None of the currently available cleansers will clean the inside of a laparoscopic instrument tube without putting a tube brush through them initially to unblock the residue in them because these cleaners do not contain enhancers that increase the enzymatic activity and surfactant strength. Since they do not contain these enhancers, the cleaners require a usage rate of a minimum of one ounce per gallon of water to accomplish what little they do. Some of these current enzymatic cleansers also contain toxic chemicals like ethylene glycol which is an auto antifreeze and flammable solvents such as ethyl and/or isopropyl alcohol.

Prior Patents and Publications

The prior art patents do not disclose the current invention. U.S. Pat. No. 4,456,544, to Lupova et al, discusses a detergent composition for treating surgical instruments and equipment which contains seven proteolytic enzymes (proteases) to ensure hydrolysis of various protein contaminations. The Lupova preparation is used in a presterilization treatment of medical instrument. It does not have all the compounds of the instant invention.

U.S. Pat. No. 5,124,066, to Russel (assigned to Lever Brothers Co.) shows a liquid detergent which includes a glycerol ether, an enzyme and boric acid but is not designed for cleaning medical instruments.

The patent to Hessel, et al, U.S. Pat. No. 5,073,292, discloses a cleaning composition having from 5 to 85% by weight of a surfactant, an enzyme and protein to stabilize the enzyme. Again, the patent fails to disclose the unique combination of compounds of the instant invention.

DeSenna, U.S. Pat. No. 5,529,788, discloses a tablet containing an enzyme for use in ultrasonic cleaning equipment. It fails to show the compounds of the instant invention. U.S. Pat. No. 5,510,052, to McCandlish, discloses a pretreatment sterilant for dishware which removes baked-on, dried-on and cooked on food wastes. There is no discussion of the problem that the instant invention solves.

Miller et al, U.S. Pat. No. 5,567,385, discloses an sterilant for use in alkaline oxidation of medical waste during shredding of the product. Again, there is no disclosure of the unique compounds of applicant nor discussion of the problems confronted by him.

U.S. Pat. No. 5,589,507, to Hall, discusses a composition for sterilizing medical devices using formic acid, an oxidizer, performic acid and water but which works totally differently from that shown by applicant.

Smithowski et al, U.S. Pat. No. 5,810,944, shows a cleansing concentrate for cleaning surgical instruments which incorporates sulphate salt together with other aids. However, this cleanser requires many steps as discussed above and does not contain the unique combination of compounds shown by applicant.

The U.S. Patent to Scoville, U.S. Pat. No. 6,235,692, discusses a foaming enzyme composition for cleaning instruments which contains antimicrobial agents and a corrosion inhibitor. It works differently than the instant invention.

U.S. Pat. No. 6,387,858, to Shah et al, discusses the same problem that applicant is solving but, as stated above, treats the instruments with a gel to prevent the residue from hardening.

Simpson, U.S. Pat. No. 6,420,332, shows a blood and stain remover, which includes a protease, an amylase, an enzyme having calcium, alcohol and an alkanolamine, a non-ionic detergent and water. While this solution may include some of the compounds disclosed by applicant, it is very different Patent Application Publications The application by Kott et al, No 2002, 0103096, discloses a cleaning surfactant composition comprising an alkylarylsulfonate surfactant system having two isomers, different from that disclosed by applicant.

Statutory Invention Registrations

Registration No. H1467, to Prieto et al, relates to a detergent containing an active surface composition with nonionic surfactant components and an alkyl sulfate anionic surfactant component. This is used as a general cleaning detergent for heavy duty use and does not address the problem addressed by applicant.

Registration H1513, to Murch et al, discloses a detergent composition having olecoyl sarcosinate and polyhydroxy fatty acid amide surfactants for improved cleaning function for general laundry cleaning.

Registration H1776, to Linard, shows an enzyme containing detergent having a pH of 9.5 or greater.

Thus it is shown that none of the prior art patents, publications or Registrations disclose treating the problem of body fluid waste and metallic ion residue adhering to medical instruments and items with the same unique detergent composition.

GENERAL DESCRIPTION

The new instant enzymatic cleanser is formulated to remove all types of bio-burden, soil, body fluids and the metallic oxides, with the exception of aluminum oxide, carbonates, and sulfides previously mentioned. Tests have shown that all of these specific unwanted adherents are removed by the cleanser.

The new enzymatic cleansers are formulated to remove all types of bio-burden, soil, body fluids and the metallic oxides (except aluminum oxide) and carbonates, previously mentioned.

Aluminum oxide is the dull protective coating on aluminum and anodized oxide coating. The instant composition will not hurt the protective aluminum oxide coating on aluminum items as it does not contain the hydroxides or any other chemical that will react with aluminum oxide. It can remove all the residues mentioned previously as it contains enzymes for the body fluids not soluble in surfactants, such as soaps, and surfactants for oils and soil. It has inorganic and organic metallic ion binders, sequestering agents, for removing the metallic oxides, carbonates and sulfides, and it has enzyme activity enhancers and surfactant builders. These ingredients also make all of the items soaked in this cleanser residue free and the metals shiny with no white or gray film or spots. This is so due to the fact that the metallic ions are kept bonded to the sequestering agents that are soluble in water and the surfactants hold these and all of the other residue in suspension until the residue can be washed away with a simple water rinse, unlike all the existing cleansers and the ones discussed in the prior patents, publications and Registrations.

Since this new formula cleans so thoroughly by stripping away all residue, including metallic ion film, and since it has a pH between 8 and 9 or 7 and 8.5 when diluted as directed (This depends on the hardness of the water it is diluted in) all the items are free of microbial contamination when cleaned in this new enzymatic cleanser. Independent testing has shown that all items washed in these cleansers are microscopically clean after rinsing. The formula can produce a clear cleaning liquid. This formula is safe to use on all types of materials these items are typically constructed of, including plastic, glass and all metals, including aluminum. It works in this safe manner as it has no hydroxides, acids or corrosives and it has no strong, toxic or corrosive organic solvents. However, this cleanser is strong enough to even clean the inside of laparocopes without using a tube scrubber either before or after soaking in an aqueous dilution of this formula for only a few minutes (2 to 5). The reason for this is that the activity of the enzymes and surfactants are greatly increased by the surfactant builders and enzyme enhancers in this formula.

With this new cleanser all items can be cleaned with no pretreatment to keep them moist, no sonicating and no scrubbing either before or after soaking. It cleans all items from 2 to 5 minutes using a dilution rate of one half of the rate of all other similar cleansers. The dilution rate is one half ounce per gallon of water for all but extreme cases like synovial fluid from joint surgeries and body fluid clogged laparoscopes, where one ounce per gallon of water is recommended. This new cleanser works faster, cleans better, with less product and with only soaking because of its surfactant builders and enzyme enhancers. It is non-foaming as none of the ingredients will support sustained foaming in water when used as directed. All ingredients are biodegradable according to the manufacturers product specification and chemical reference books like the Merck Index. This cleanser/detergent is non-toxic and environmentally safe when used as directed (one ounce per gallon of water maximum) and all individual ingredient concentrations are below city water out-flow limits in most instances. This is based on the typical amount of hospital out-flow (over 1000 gallons) and typical city out-flow concentration limits (112.5 parts per million maximum per the city of Roanoke, Va., water treatment facility, for instance) of the regulated ingredients (sodium Tripolyphosphate). It is nontoxic, when used as directed, based on each ingredients material safety sheet.

OBJECTS OF THE INVENTION

Accordingly, it is an object of this invention to provide a new improved cleansing composition for medical instruments and items, and It is another object of this invention to provide a medical instrument cleanser that requires not pretreatment to keep them moist, nor any pretreatment with gels, and It is still another object of this invention to provide an improved medical instrument cleanser that does not require any sonicating, and It is a further object of this invention to provide a medical instrument cleanser which does not require any scrubbing of the instruments before or after cleaning, and A still further object of the invention is to provide a cleanser for medical and animal operative instruments and items that will remove all body-fluid residue and metallic oxides, carbonates and sulfides therefrom in an efficient manner, and Another object of this invention is to provide a biodegradable, non-foaming non-toxic, cleansing agent for medical instruments and items, and A yet further object of this invention is to provide an improved medical instrument and item cleanser having calcium chloride, sodium formate, sodium tripolyphosphate, sodium xylene sulfonate, anionic and nonionic surfactants, a protease enzyme and a amylase enzyme.

SPECIFIC DESCRIPTION

When used as directed, (one ounce per gallon of water maximum) all individual ingredient concentrations are below city water out flow limits. This is based on the usage rate of this cleanser of one half ounce per gallon of water (0.2 grams total phosphate) and the typical city limit of an average of 3.75 pounds total phosphate per day (1701 grams) maximum per the Roanoke, Va. water treatment facility) of the regulated ingredients (sodium Tripolyphosphate). It is nontoxic, when used as directed, based on each ingredient material safety data sheet.

The First Preferred Embodiment of the Invention is as Follows

In Phase I the following are mixed together.

The composition of the cleanser includes 64 to 68%, by weight, of water as the main solvent.

One to two percent, by weight, of sodium formate is employed as an enzyme stabilizer, buffering agent and to solubilize trivalent metallic ions which help remove the white and gray film from the instruments and items being cleaned.

From 0.1 to 0.3%, by weight, of calcium chloride. From 0.1 to 0.3%, by weight, of calcium chloride to help activate and stabilize the enzymes, calcium for protease and chlorine for amylase. The chloride is also a source of chloride ion which helps activate amylase enzymes. It is a surfactant builder that greatly increases the cleaning ability of the surfactants.

Sodium tripolyphosphate, 4 to 6% by weight, is used to work as a buffer which greatly increases the cleaning ability of surfactants. It is a sequestering agent for removing metallic ions like calcium and magnesium carbonates, other oxides and sulfides.

From 9 to 11%, by weight, of sodium xylene sulfonate as a hydrotropic nonionic surfactant to improve the solubility properties of water.

All of the foregoing ingredients are mixed together until all the solids are dissolved.

In Phase 2, the following are mixed with the mixture of Phase I.

Three to Five Percent, by weight, of protease enzyme to remove protein based materials, such a blood, by hydrolysis.

Amylase enzyme, from 1 to 3%, by weight, to remove carbohydrate based materials (sugars, starches, celluloses) by hydrolysis. This also increases the rate of protease enzyme hydrolysis reaction.

These enzymes are then added to the mixture of Phase 1.

In Phase 3, the following are added together and then added to Phase I after the enzymes are added.

Alkoxylated isopropanolamide, from 9 to 11%, by weight, a nonionic surfactant, used as a wetting agent with no foaming and high metallic cleaning capacity. It is also compatable with high pH solutions and enzymes.

From 0.5 to 1.5% of a sodium alkane sulfonate, sodium capryl sulfonate mixture. This is an anionic surfactant to augment the nonionic surfactants, improving the wetting and cleaning capacities. This is also hydrotropic, low foaming and aids in stability.

Approximately 0.1%, by weight, of a fragrance to give the mixture a pleasant odor.

These ingredients are combined and then added to the combined Phase 1 and Phase 2 mixture.

The Second Preferred Embodiment

1. Initially, 50 to 58% water is used as the main solvent.

2. 0.5 to 2% sodium formate are added as an enzyme stabilizer, buffering agent which solublizes trivalent metallic ions which helps remove the white and gray film from the items being cleaned.

3. 0.1 to 0.3% calcium chloride is added as a source of calcium to help activate and stabilize the enzymes, calcium for protease and chlorine for amylase. It is also a source of chloride ion which helps activate amylase enzymes.

4. 0.5 to 2.5% sodium tripolyphosphate to work as a buffer to keep the pH near 1 10 which stabilizes the enzymes. It acts as a builder which greatly increases the cleaning ability of surfactants. It is also a sequestering agent for removing metallic ions like calcium and magnesium carbonates, other oxides and sulfides.

5. 15 to 20% hydrotropic surfactant (Sodium Xylenesulfonate or Sodium-octy sulfate) to improve the solubility properties of water.

6. 2 to 5% protease enzyme to remove protein based materials (i.e., blood) by hydrolysis.

7. 0.9 to 2.5% amylase enzyme to remove carbohydrate based materials (i.e., sugars, starches and celluloses) by hydrolysis. This action also increases the rate of the protease enzyme hydrolysis reaction.

8. 4 to 5% (Alkoxylated Isopropanolamide or Dehypon LS 54) nonionic surfactant to be used as a cleaning and wetting agent with no foaming and high metallic cleaning action. It is also compatible with high pH solutions and enzymes.

9. 3 to 5% Lauryl Alcohol Alkoxylate to adjust the HLB upward to improve the solubility properties of the lipophylic organics.

10. 0.4 to 0.8% of a sodium alkane sulfonate, mixture as an organic solubilizer It is an anionic surfactant to augment the nonionic surfactants, improving the wetting and cleaning action. It is also hydrotropic, low foaming and aids in stability.

11. 1 to 2% Sodium Borate decahydrate to improve the enzyme long term stability.

12. 3 to 10% Propylene Glycol to improve the enzyme long term stability and lower the freezing point.

13. Approximately 0.1% Propylparaben as a preservative.

14. Approximately 0.1% Methylparaben as a preservative.

15. Approximately 0.1% of a fragrance to give the mixture a pleasant odor.

In preparing the product, Phase 1 equals half of the water (hot) combined with ingredients 2 and 3.

Phase 2 involves mixing the other half of the water (hot) with ingredients 4 and 5. Ingredients 8, 9, 10, 13, and 20% of ingredient 11 are combined separately and then added to make up the rest of Phase 2.

Phase 3 involves mixing ingredients 6, 7, 12, 13, 14 and the remaining 80% of ingredient 11.

Cool Phase 1 and then add Phase 3 to it.

Cool Phase 2 and slowly add to it the combined Phases 1 and 3.

Having described a first preferred embodiment of the invention followed by a description of a second preferred embodiment it will be obvious to those of ordinary skill in the art to come up with other modifications and changes that are covered by the scope of the appended claims.

What is claimed is:

1. A non-toxic and environmentally safe cleanser for cleaning equipment and instruments which have bio-residue such as blood and other body fluids adhered thereto in a dried state, said non-toxic cleanser consisting of the following components:

water,
sodium formate,
sodium tripolyphosphate,
sodium xylene sulfonate,
alkoxylated isopropanolamide,
sodium alkane sulfonate and sodium capryl mixture,
protease enzyme,
amylase enzyme,
and optionally, fragrance, calcium chloride, lauryl alcohol alkoxylate, sodium borate decahydrate, propylene glycol, propylparaben, and methylparaben.

2. A cleanser as in claim 1 wherein said water component is from 64% to 68% by weight.

3. A cleanser as in claim 1 wherein said sodium formate component is from 1 to 2% by weight.

4. A cleanser as in claim 1 wherein said sodium tripolyphosphate component is from 4 to 6% by weight.

5. A cleanser as in claim 1 wherein said sodium xylene sulfonate component is from 9 to 11% by weight.

6. A cleanser as in claim 1 wherein said protease enzyme component is from 3 to 5% by weight.

7. A cleanser as in claim 1 wherein said amylase enzyme component is from 1 to 3% by weight.

8. A cleanser as in claim 1 wherein said calcium chloride component is from 0.1 to 0.3% by weight.

9. A cleanser as in claim 1 wherein said isopropanolamide component is from 9 to 11% by weight.

10. A cleaner as in claim 1 wherein said sodium alkane sulfonate and sodium capryl mixture is from 0.5 to 1.5% by weight.

11. A cleanser as in claim 1 wherein said fragrance is 0.1% by weight.

12. A method of making a non-toxic and environmentally safe cleanser for equipment and instruments which have bio-residue attached thereto, said method comprises the steps of adding and mixing a composition consisting of the following components:

water,
sodium formate,
sodium tripolyphosphate,
sodium xylene sulfonate,
alkoxylated isopropanolamide,
a mixture of sodium alkane sulfonate and sodium capryl,
protease enzyme,
amylase enzyme,
and optionally, fragrance, calcium chloride, lauryl alcohol alkoxylate, sodium borate decahydrate, propylene glycol, propylparaben, and methylparaben;
wherein the composition is mixed until all solids are dissolved.

13. A method as in claim 12 wherein said water is from 64 to 68% by weight.

14. A method as claim 12 wherein said sodium formate is from 1 to 2% by weight.

15. A method as in claim 12 wherein said sodium tripolyphosphate is present from 4 to 6% by weight.

16. A method as in claim 12 wherein said sodium xylene sulfonate is from 9 to 11% by weight.

17. A method as in claim 12 wherein said protease enzyme is from 3 to 5% by weight.

18. A method as in claim 12 wherein said amylase enzyme is from 1 to 3% by weight.

19. A method as in claim 12 wherein said calcium chloride is from 0.1 to 0.3% by weight.

20. A method as in claim 12 wherein said sodium alkane sulfonate, sodium capryl mixture and isopropanolamide are first combined prior to mixing of the other components.

21. A method as in claim 20 wherein said isopropanolamide is present from 9 to 11% by weight and said mixture is present from 0.5 to 1.5% by weight.

22. A method of cleaning instruments and equipment which have a bio residue thereon, said method comprising, the step of contacting said equipment and instruments with a non-toxic and environmentally safe cleanser composition by immersion or application thereof,
and rinsing said equipment and instruments after cleaning;
wherein in said non-toxic and environmentally safe cleanser composition consists of the following components:

water from 64 to 68% by weight,
sodium formate from 1 to 2% by weight,
sodium tripolyphosphate from 4 to 6% by weight,
sodium xylene sulfonate from 9 to 11% by weight,
alkoxylated isopropanolamide,
a mixture of sodium alkane sulfonate and sodium capryl,
a protease enzyme from 3 to 5% by weight,
a amylase enzyme from 1 to 3% by weight,
and optionally, fragrance, calcium chloride, lauryl alcohol alkoxylate, sodium borate decahydrate, propylene glycol, propylparaben, and methylparaben.

23. A method as in claim 22 wherein said calcium chloride is from 0.1 to 0.3% by weight.

24. A method as in claim 22 wherein said alkoxylated isopropanolnmide is from 9 to 11% by weight, and said sodium alkane sulfonate from 0.5 to 1.5% by weight.

25. A cleanser as in claim 1.

26. A cleanser as in claim 1.

27. A cleanser as in claim 1.

28. A cleanser as in claim 1.

29. A cleanser as in claim 1 wherein said sodium borate decahydrate.

30. A cleanser as in claim 1 wherein said propylene glycol is from 3 to 10% by weight.

31. A cleanser as in claim 1 wherein in said propylparaben is a preservative in an amount of 0.1%.

32. A cleanser as in claim 1 wherein in said methylparaben is a preservative in an amount of 0.1%.

* * * * *